United States Patent Office 3,769,218
Patented Oct. 30, 1973

3,769,218

PIEZOELECTRIC CERAMIC COMPOSITIONS

Hiromu Ouchi, Toyonaka, Masamitsu Nishida, Osaka, and Katsuo Nagano, Hirakata, Japan, assignors to Matsushita Electric Industrial Co., Ltd., Osaka, Japan

No Drawing. Filed Apr. 22, 1971, Ser. No. 136,578
Claims priority, application Japan, Apr. 27, 1970, 45/36,575
Int. Cl. C04b *35/46, 35/48*
U.S. Cl. 252—62.9 6 Claims

ABSTRACT OF THE DISCLOSURE

Piezoelectric ceramic compositions having high mechanical strength, high electrical breakdown strength, high electromechanical coupling coefficient and dielectric constant and high stability in resonant frequency over a wide temperature range, and comprising the solid solution in the system

| | Percent Mol |
|---|---|
| PbO | 54.8–50.1 |
| $Li_2O$ | 4.0–0.1 |
| $Nb_2O_5$ | 7.3–0.2 |
| $TiO_2$ | 24.8–16.4 |
| $ZrO_2$ | 26.9–16.4 |

and the $Nb_2O_5/Li_2O$ mol ratio has a value selected from within the range $5.00 \geqq Nb_2O_5/Li_2O \geqq 3.16$ or $$2.84 \geqq Nb_2O_5/Li_2O \geqq 2.00.$$

This invention relates to piezoelectric ceramic compositions and articles of manufacture fabricated therefrom. More particularly, the invention pertains to novel and improved ferroelectric ceramics which are polycrystalline aggregates of particular constituents. These piezoelectric compositions are sintered to ceramics by ordinary ceramic techniques and thereafter the ceramics are polarized by applying a D-C voltage between the electrodes to impart thereto electromechanical transducing properties similar to the well-known piezoelectric effect. The invention also encompasses the calcined product of raw ingredients and the articles of manufacture such as electromechanical transducers fabricated from the sintered ceramic.

The ceramic bodies materialized by the present invention exist basically in the solid solution comprising the system $PbO—Li_2O—Nb_2O_5—TiO_2—ZrO_2$, in solid solution form, wherein

| | Mol percent |
|---|---|
| PbO | 54.8–50.1 |
| $Li_2O$ | 4.0–0.1 |
| $Nb_2O_5$ | 7.3–0.2 |
| $TiO_2$ | 24.8–16.4 |
| $ZrO_2$ | 26.9–16.4 |

and the $Nb_2O_5/Li_2O$ mol ratio has a value selected from within the range $5.00 \geqq Nb_2O_5/Li_2O \geqq 3.16$ or $$2.84 \geqq Nb_2O_5/Li_2O \geqq 2.00.$$

The use of piezoelectric materials in various transducer applications in the production, measurement and sensing of sound, shock, vibration, pressure, etc. has increased greatly in recent years. Both crystal and ceramic types of transducers have been widely used. But, because of their potentially lower cost and facility in the fabrication of ceramics with various shapes and sizes and their greater durability for high temperature and/or for humidity than that of crystalline substances such as Rochelle salt, piezoelectric ceramic materials have recently achieved importance in various transducer applications.

The piezoelectric characteristics of ceramics required apparently vary with species of applications. For example, electromechanical transducers such as phonograph pickups, microphones and voltage generators in ignition systems require piezoelectric ceramics characterized by a substantially high electromechanical coupling coefficient, dielectric constant and high mechanical and electrical strength. On the other hand, it is desired in filter applications of piezoelectric ceramics that the materials exhibit a high stability with temperature and time in resonant frequency and in other electrical properties.

As more promising ceramics for these requirements, lead titanate-lead zirconate is in wide use up to now and their properties are disclosed in U.S. Pats. Nos. 2,708,244 and 2,849,404. However, it is difficults to get high mechanical and electrical breakdown strength along with high planar coupling coefficient, dielectric constant and temperature stability in resonant frequency in the lead titanate-lead zirconate ceramics. And the dielectric and piezoelectric properties of the lead titanate-lead zirconate ceramics change greatly with firing technique which is ascribable to evaporation of PbO.

SUMMARY OF THE INVENTION

It is, therefore, the fundamental object of the present invention to provide novel and improved piezoelectric ceramic materials which overcome the problems outlined above.

A more specific object of the invention is to provide improved polycrystalline ceramics characterized by very high mechanical and electrical breakdown strength along with high planar coupling coefficient, dielectric constant and temperature stability in resonant frequency.

Another object of the invention is the provision of novel piezoelectric ceramic composition, certain properties of which can be adjusted to suit various applications.

Still another object of the invention is the provision of improved electromechanical transducer utilizing, as the active elements, an electrostatically polarized body of the novel ceramic compositions.

These object are achieved by providing ceramic bodies which exist basically in the solid solution comprising the system PbO (54.8 to 50.1 mol percent)—$Li_2O$ (4.0 to 0.1 mol percent)—$Nb_2O_5$ (7.3 to 0.2 mol percent)—$TiO_2$ (24.8 to 16.4 mol percent)—$ZrO_2$ (26.9 to 16.4 mol percent) and the $Nb_2O_5/Li_2O$ mol ratio has a value selected from within the range $5.00 \geqq Nb_2O_5/Li_2O \geqq 3.16$ or $$2.84 \geqq Nb_2O_5/Li_2O \geqq 2.00.$$

DETAILED DESCRIPTION OF THE INVENTION

The present invention is based on the discovery that within certain particular compositional ranges of the system $PbO—Li_2O—Nb_2O_5—TiO_2—ZrO_2$ the specimens exhibit very high mechanical bending strength and electrical breakdown strength along with high planar coupling coefficient, dielectric constant and high stability in resonant frequency with temperature.

The present invention has various advantages in manufacturing process and in application for ceramic transducers. It has been known that the evaporation of PbO during firing is a problem in sintering of lead compounds such as lead titanate-zirconate. The compositions of the invention evidence a smaller amount of evaporated PbO than the lead titanate-lead zirconate ceramics upon firing. The invented composition can be fired in the absence of any particular control of PbO atmosphere. A well sintered body of the present composition is obtained by firing in a ceramic sagger with a ceramic cover made of $Al_2O_3$ ceramic. A high sintered density is desirable for humidity resistance and high piezoelectric response when the sintered body is utilized as an electromechanical transducer and for other application.

All possible compositions coming within the system are represented by the mol percent of each oxide component of the system $$PbO—Li_2O—Nb_2O_5—TiO_2—ZrO_2.$$

Some compositions represented by the system $$PbO—Li_2O—Nb_2O_5—TiO_2—ZrO_2,$$

however, do not exhibit high piezoelectricity, and many are electromechanically active only to a slight degree. The present invention is concerned only with those basic compositions exhibiting piezoelectric response of appreciable magnitude. As a matter of convenience, the planar coupling coefficient ($K_p$) of test discs will be taken as a measure of piezoelectric activity. Thus, all compositions polarized and tested which represented by the system $$wPbo—vLi_2O—xNb_2O_5—yTiO_2—zZrO_2,$$

wherein $w$, $v$, $x$, $y$, and $z$ respectively had a following mol percent, $w$=54.8 to 50.1, $v$=4.0 to 0.1, $x$=7.3 to 0.2, $y$=24.8 to 16.4, $z$=26.9 to 16.4, and $$w+v+x+y+z=100,$$

showed a planar coupling coefficient of approximately 0.59 or higher, mechanical bending strength approximately 1300 kg./cm.$^2$ or higher, electrical breakdown voltage of approximately 19.5 kv./mm. or higher, and high temperature stability in resonant frequency smaller than 0.25% in the range of 20° C. to 80° C.

According to the present invention, piezoelectric and dielectric properties of the ceramics can be adjusted to suit various applications by selecting the proper composition. However, the compositions out of said mol percent showed a poor characteristic value in the one property of among these characteristic features.

The compositions described herein may be prepared in accordance with well known ceramic procedures. An advantageous method, however, hereinafter more fully described, consist in the use of PbO or $Pb_3O_4$, $Li_2CO_3$ or LiOH, $Nb_2O_5$, $TiO_2$ and $ZrO_2$ as starting materials.

EXAMPLE

The starting materials, viz, lead oxide (PbO), lithium carbonate ($Li_2CO_3$), niobia ($Nb_2O_5$), titania ($TiO_2$) and zirconia ($ZrO_2$), all of relatively pure grade (e.g., C.P. grade) are intimately mixed in a rubber-lined ball mill with distilled water. In milling the mixture, care should be exercised to avoid contamination thereof due to wear of the milling ball or stones. This may be avoided by varying the proportions of the starting materials to compensate for any contamination.

Following the wet milling, the mixture is dried and mixed to insure as homogeneous a mixture as possible. Thereafter, the samples for which data are given hereinbelow were prepared by mixing 100 grams of the milled mixture with 5 cc. of binder solution such as poly vinyl alcohol solution and granulating. The mix was then pressed into discs of 20 mm. diameter and 2 mm. thickness at a pressure of 700 kg./cm.$^2$. The pressed discs were fired at 1200–1300° C. for 60 minutes of heating period. According to the present invention, there is no need to fire the composition for calcination and there is no need to fire the composition in an atmosphere of PbO. Moreover, there is no need to maintain a special temperature gradient in the firing furnace as is necessary in prior art procedures. Thus, according to the present invention, uniform and excellent piezoelectric ceramic bodies can be easily obtained simply by covering the samples with an alumina sagger during firing.

The sintered ceramics were polished on both surfaces to the thickness of 1 millimeter. The polished disc surfaces were then coated with silver paint and fired to form silver electrodes. Finally, the discs were polarized while immersed in a bath of silicone oil at 100° C. A voltage gradient of D-C 4.5 kv. per mm. was maintained for one hour, and the discs field-cooled to room temperature in thirty minutes.

The piezoelectric and dielectric properties of the polarized specimen were measured at 25° C. in a relative humidity of 50% and at a frequency of 1 kHz. Examples of specific ceramic compositions according to this invention and various pertinent electromechanical, dielectric properties, mechanical bending strength, electrical breakdown strength, and temperature stability in resonant frequency thereof are given in Table 1. As the comparative example, Table 2 shows the exemplary piezoelectric ceramic compositions selected from out of the scope of the system according to the present invention.

TABLE 1

| Example No. | Mol percent of composition | | | | | Dielectric constant at 1 kHz. | Planar coupling coeff. | Temperature change in resonant frequency (percent) | Electrical breakdown strength (kv./mm.) | Mechanical bending strength (kg./cm.$^2$) |
|---|---|---|---|---|---|---|---|---|---|---|
| | PbO | $Li_2O$ | $Nb_2O_5$ | $TiO_2$ | $ZrO_2$ | $\epsilon$ | $k_p$ | | | |
| 1 | 54.8 | 2.3 | 7.3 | 19.2 | 16.4 | 1,570 | 0.603 | 0.05 | 19.5 | 1,310 |
| 2 | 52.6 | 1.4 | 3.9 | 22.7 | 19.5 | 1,780 | 0.598 | 0.08 | 19.8 | 1,350 |
| 3 | 51.3 | 0.6 | 1.9 | 24.1 | 22.1 | 1,360 | 0.601 | 0.06 | 20.3 | 1,320 |
| 4 | 50.7 | 0.2 | 1.0 | 24.8 | 23.3 | 1,510 | 0.634 | 0.08 | 19.7 | 1,330 |
| 5 | 50.1 | 0.1 | 0.2 | 24.1 | 25.5 | 1,830 | 0.720 | 0.24 | 19.5 | 1,300 |
| 6 | 54.8 | 2.5 | 7.1 | 16.4 | 19.2 | 1,520 | 0.615 | 0.07 | 20.1 | 1,340 |
| 7 | 52.6 | 1.2 | 4.0 | 18.5 | 23.7 | 1,350 | 0.607 | 0.12 | 20.8 | 1,360 |
| 8 | 50.6 | 0.4 | 0.8 | 21.3 | 26.9 | 1,300 | 0.678 | 0.19 | 20.5 | 1,350 |
| 9 | 50.1 | 0.1 | 0.2 | 23.0 | 26.6 | 1,640 | 0.700 | 0.21 | 19.6 | 1,310 |
| 10 | 51.9 | 1.1 | 2.8 | 20.8 | 23.4 | 1,370 | 0.682 | 0.14 | 19.8 | 1,340 |
| 11 | 50.6 | 0.3 | 1.0 | 22.8 | 25.3 | 1,780 | 0.730 | 0.25 | 19.7 | 1,300 |

TABLE 2

| Example No. | Mol percent of composition | | | | | Dielectric constant at 1 kHz. | Planar coupling coeff. | Temperature change in resonant frequency (percent) | Electrical breakdown strength (kv./mm.) | Mechanical bending strength (kg./cm.$^2$) |
|---|---|---|---|---|---|---|---|---|---|---|
| | PbO | $Li_2O$ | $Nb_2O_5$ | $TiO_2$ | $ZrO_2$ | $\epsilon$ | $k_p$ | | | |
| | Composition | | | | | | | | | |
| 12 | 57.1 | 3.6 | 10.7 | 13.7 | 14.9 | 720 | 0.224 | 0.29 | 18.1 | 1,250 |
| 13 | 52.6 | 1.3 | 4.0 | 25.8 | 16.3 | 1,060 | 0.445 | 0.28 | 16.3 | 1,300 |
| 14 | 54.1 | 2.0 | 6.1 | 12.4 | 25.4 | 750 | 0.302 | 0.27 | 17.5 | 1,320 |
| 15 | 50.0 | 0.04 | 0.16 | 19.8 | 30.0 | 780 | 0.418 | 0.28 | 11.2 | 1,060 |
| 16 | Exclusive of $Li_2O$ from Ex. No. 5 | | | | | 1,210 | 0.453 | 0.38 | 10.8 | 910 |
| 17 | Exclusive of $Nb_2O_5$ from Ex. No. 5 | | | | | 1,030 | 0.436 | 0.51 | 11.4 | 970 |
| 18 | $Pb(Zr_{0.53}Ti_{0.47})O_3$ | | | | | 594 | 0.498 | 1.57 | 10.6 | 850 |
| 19 | $Pb(Zr_{0.53}Ti_{0.47})O_3$ 1 wt. percent $Nb_2O_5$ | | | | | 1,260 | 0.545 | 0.54 | 10.5 | 890 |

From Table 1 it will be readily evident that all exemplary compositions selected from the system $$wPbO—vLi_2O—xNb_2O_5—yTiO_2—zZrO_2,$$

wherein subscripts $w$, $v$, $x$, $y$ and $z$ respectively had a following mol percent, $w$=54.8 to 50.1, $v$=4.0 to 0.1, $x$=7.3 to 0.2, $y$=24.8 to 16.4, $z$=26.9 to 16.4, and $$w+v+x+y+z=100$$

and the $Nb_2O_5/Li_2O$ mol ratio has a value selected from within the range $$5.00 \geqq Nb_2O_5/Li_2O \geqq 3.16$$

or $$2.84 \geqq Nb_2O_5/Li_2O \geqq 2.00$$

are characterized by very high mechanical bending strength and high electrical breakdown strength along with high planar coupling coefficient, dielectric constant and high stability in resonant frequency over a temperature range of 20 to 80° C. All of which properties are important for the use of piezoelectric compositions in phonographic ceramic pickup cartridge, ceramic microphone element, ceramic ignitor element applied as park source for gas, and ultra-sonic transducer applications. From the comparison between Table 1 and Table 2, it will be obvious that the compositions within the range of the system $$wPbO—vLi_2O—xNb_2O_5—yTiO_2—zZrO_2,$$

wherein $w=54.8$ to 50.1, $v=4.0$ to 0.1, $x=7.3$ to 0.2, $y=24.8$ to 16.4, $z=26.9$ to 16.4, and $$w+v+x+y+z=100$$

mol percent and the $Nb_2O_5/Li_2O$ mol ratio has a value selected from within the range $$5.00 \geqq Nb_2O_5/Li_2O \geqq 3.16$$

or $$2.84 \geqq Nb_2O_5/Li_2O \geqq 2.00$$

exhibit a marked improvement in mechanical bending strength and electromechanical coupling coefficient along with high dielectric constant. Therefore, the piezoelectric ceramics according to the present invention are suitable for use in acoustic devices such as phonograph pickups and microphones. Also in addition to above characteristic properties, the piezoelectric ceramics having high stability in resonant frequency with temperature are suitable for use in various reed filter used in portable wireless communication equipment, parallel-tuning fork and oscillator application. The temperature change in resonant frequency within the range 20° to 80° C. is low with the composition Examples Nos. 1, 2, 3, 4, 6. These ceramics are desirable for use in reed filter element. According to Table 1 the values of planar coupling coefficient and dielectric constant can be adjusted to suit various applications by appropriately selecting the composition.

Curie temperature of typical sample of Examples Nos. 5 and 11 are 370° C. and 340° C., respectively. These data indicate that the piezoelectric ceramic compositions according to present invention are expected to have a high potential as electromechanical transducers up to relatively high temperature.

Table 2 shows the dielectric, piezoelectric, mechanical strength, electrical breakdown strength and temperature change in resonant frequency on the ceramic composition out of the scope of the system according to the present invention. It will be seen from Table 2 that the ceramic compositions out of the scope of present invention e.g. Examples Nos. 12 to 15 show a low electromechanical planar coupling coefficient and a large temperature change in resonant frequency. Also, it will be apparent from Table 2 that the ceramic composition e.g. Examples Nos. 16 and 17 which are lacking one component of $Li_2O$ or $Nb_2O_5$ from the Example No. 5 composition according to the present invention, show a poor piezoelectric properties and mechanical strength. Further, it will be clear from Table 2 and the ceramic compositions, e.g. Examples Nos. 18 and 19 which are well known as usual lead titanate-lead zirconate are no match for the composition according to the present invention.

From Tables 1 and 2, it will be readily evident that the superior piezoelectric ceramic compositions can be obtained only from the five components within the scope of the present invention system.

In addition to the superior properties shown above, the compositions according to the present invention yield ceramics of good physical quality and which polarize well. It will be understood from the foregoing that the solid solution ceramics $$wPbO—vLi_2O—xNb_2O_5—yTiO_2—zZrO_2$$

form an excellent piezoelectric ceramic body.

It will be evident that the starting materials to be used in this invention are not limited to those used in the above examples. Those oxides, hydroxides and carbonates may be used instead of any starting material of above examples, which are easily decomposed to form required compositions at elevated temperature.

What is claimed is:

1. A piezoelectric ceramic composition consisting essentially of a solid solution of a material selected from the system $$wPbO—vLi_2O—xNb_2O_5—yTiO_2—zZrO_2,$$

wherein subscripts $w$, $v$, $x$, $y$ and $z$ respectively have a following mol percent, $w=54.8$ to 50.1, $v=4.0$ to 0.1, $x=7.3$ to 0.2, $y=24.8$ to 16.4, $z=26.9$ to 16.4, and $$w+v+x+y+z=100,$$

and the $Nb_2O_5/Li_2O$ mol ratio has a value selected from within the range $$5.00 \geqq Nb_2O_5/Li_2O \geqq 3.16$$

or $$2.84 \geqq Nb_2O_5/Li_2O \geqq 2.00.$$

2. A piezoelectric ceramic material consisting of the solid solution having the following mol percent composition: PbO 54.8, $Li_2O$ 2.3, $Nb_2O_5$ 7.3, $TiO_2$ 19.2 and $ZrO_2$ 16.4.

3. A piezoelectric ceramic material consisting of the solid solution having the following mol percent composition: PbO 52.6, $Li_2O$ 1.4, $Nb_2O_5$ 3.9, $TiO_2$ 22.7, and $ZrO_2$ 19.5.

4. A piezoelectric ceramic material consisting of the solid solution having the following mol percent composition: PbO 51.3, $Li_2O$ 0.6, $Nb_2O_5$ 1.9, $TiO_2$ 24.1, and $ZrO_2$ 22.1.

5. A piezoelectric ceramic material consisting of the solid solution having the following mol percent composition: PbO 50.7, $Li_2O$ 0.2, $Nb_2O_5$ 1.0, $TiO_2$ 24.8, and $ZrO_2$ 23.3.

6. A piezoelectric ceramic material consisting of the solid solution having the following mol percent composition: PbO 54.8, $Li_2O$ 2.5, $Nb_2O_5$ 7.1, $TiO_2$ 16.4, and $ZrO_2$ 19.2.

References Cited

UNITED STATES PATENTS 3,544,469 12/1970 Watanabe et al. ______ 252—62.9

FOREIGN PATENTS 1,184,863 3/1970 Great Britain _______ 252—62.9

EDUARD J. MEROS, Primary Examiner

J. COOPER, Assistant Examiner